United States Patent
Duncan et al.

(10) Patent No.: US 7,469,309 B1
(45) Date of Patent: Dec. 23, 2008

(54) PEER-TO-PEER DATA TRANSFER METHOD AND APPARATUS WITH REQUEST LIMITS

(75) Inventors: Samuel Hammond Duncan, Arlington, MA (US); Wei-Je Huang, Fremont, CA (US); Radha Kanekal, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 71 days.

(21) Appl. No.: 11/302,451

(22) Filed: Dec. 12, 2005

(51) Int. Cl.
*G06F 13/22* (2006.01)
*G06F 3/00* (2006.01)
*G06F 12/00* (2006.01)
*G06F 13/24* (2006.01)

(52) U.S. Cl. .......................... 710/240; 710/52; 710/54; 710/260; 711/154

(58) Field of Classification Search ................ 710/200, 710/240, 29
See application file for complete search history.

(56) References Cited

U.S. PATENT DOCUMENTS

| | | | |
|---|---|---|---|
| 4,626,912 A | 12/1986 | Wilkinson et al. | |
| 5,481,555 A | 1/1996 | Wade et al. | |
| 5,822,195 A | 10/1998 | Brench et al. | |
| 5,898,888 A | 4/1999 | Guthrie et al. | |
| 5,953,538 A | 9/1999 | Duncan et al. | |
| 5,991,797 A | 11/1999 | Futral et al. | |
| 6,012,120 A | 1/2000 | Duncan et al. | |
| 6,021,456 A | 2/2000 | Herdeg et al. | |
| 6,032,232 A * | 2/2000 | Lindeborg et al. | 711/149 |
| 6,094,655 A * | 7/2000 | Rogers et al. | 707/10 |
| 6,128,690 A | 10/2000 | Purcell et al. | |
| 6,128,711 A | 10/2000 | Duncan et al. | |
| 6,275,888 B1 | 8/2001 | Porterfield | |
| 6,353,877 B1 | 3/2002 | Duncan et al. | |
| 6,591,349 B1 * | 7/2003 | Steinman et al. | 711/154 |
| 6,633,967 B1 | 10/2003 | Duncan | |
| 6,647,453 B1 | 11/2003 | Duncan | |
| 6,701,387 B1 | 3/2004 | Pannel et al. | |
| 6,795,881 B1 * | 9/2004 | Bachrach | 710/100 |
| 6,859,851 B1 * | 2/2005 | Sheaffer | 710/52 |
| 6,888,824 B1 * | 5/2005 | Fang et al. | 370/359 |
| 6,901,451 B1 * | 5/2005 | Miyoshi et al. | 709/232 |
| 6,950,885 B2 * | 9/2005 | Shah | 710/36 |
| 6,993,613 B2 * | 1/2006 | Connor et al. | 710/260 |
| 7,136,970 B2 * | 11/2006 | Yoshiya et al. | 711/152 |
| 7,155,554 B2 * | 12/2006 | Vinogradov et al. | 710/305 |
| 7,162,567 B2 * | 1/2007 | Jeddeloh | 711/5 |
| 7,188,219 B2 * | 3/2007 | Jeddeloh | 711/154 |
| 7,213,087 B1 * | 5/2007 | Bertone et al. | 710/56 |
| 7,228,354 B2 * | 6/2007 | Chambliss et al. | 709/229 |
| 7,275,123 B2 * | 9/2007 | Duncan et al. | 710/309 |
| 2005/0033875 A1 * | 2/2005 | Cheung et al. | 710/29 |
| 2006/0007946 A1 * | 1/2006 | Kastenholz et al. | 370/401 |
| 2006/0067225 A1 * | 3/2006 | Fedorkow et al. | 370/235 |
| 2006/0090112 A1 * | 4/2006 | Cochran et al. | 714/737 |
| 2006/0120376 A1 * | 6/2006 | Duncan et al. | 370/393 |
| 2006/0123142 A1 * | 6/2006 | Duncan et al. | 710/5 |

* cited by examiner

*Primary Examiner*—Paul R Myers
*Assistant Examiner*—Brian T Misiura
(74) *Attorney, Agent, or Firm*—Townsend and Townsend and Crew LLP (57) ABSTRACT

Methods and apparatus for peer-to-peer data transfers in a computing environment provide configurable control over the number of outstanding read requests by one peer device to another. A requesting peer device includes a control register that stores a high-watermark value associated with requests to a target peer device. Each time a read request to the target peer device is generated, the number of such requests already outstanding is compared to the high-water mark. The request is blocked if the number of outstanding requests exceeds the high-water mark and remains blocked until such time as the number of outstanding requests no longer exceeds the high-water mark. Different high-water marks can be associated with different combinations of requesting and target devices.

14 Claims, 8 Drawing Sheets

PEER-TO-PEER DATA TRANSFER METHOD AND APPARATUS WITH REQUEST LIMITS

CROSS-REFERENCES TO RELATED APPLICATIONS

The present disclosure is related to the following commonly-assigned U.S. patent applications: application Ser. No. 11/005,150, filed Dec. 6, 2004, entitled "Method and Apparatus for Providing Peer-to-Peer Data Transfer within a Computing Environment," now U.S. Pat. No. 7,275,123; and application Ser. No. 11/005,451, filed Dec. 6, 2004, entitled "Method and Apparatus for Providing Peer-to-Peer Data Transfer within a Computing Environment." The respective disclosures of these applications are incorporated herein by reference for all purposes.

BACKGROUND OF THE INVENTION

The present invention relates in general to data transfer within a computing environment, and in particular to peer-to-peer data transfer within a computing environment.

In modern computing environments, various devices are connected to one another via an interconnectivity fabric such as a network or bus structure. The devices generally contain local memory that is used by a device during a computation, and multiple devices are operated in parallel to provide processing speed and flexibility within the computing environment.

One example of such a computing environment is used for graphics processing. Multiple graphics processing units (GPUs) are connected to one another by an interconnectivity fabric, and each GPU is coupled to a frame buffer (i.e., local memory). The frame buffer stores graphics data being processed by the individual GPUs. Generally, large amounts of data need to be processed by the GPUs to render textures and create other graphics information for display. To achieve rapid processing, the processing task is divided among the GPUs such that different components of the task are performed in parallel.

At times, in such a computing environment, one of the GPUs may be required to use information that is stored in the frame buffer of a peer GPU or may be required to write information to a frame buffer of a peer GPU so that the peer GPU may use that information. Presently, implementations of many interconnectivity fabric standards such as AGP, PCI, PCI-Express™, advance switching and the like enable peers to write information to another peer's address space but do not enable reading of information stored in another peer's address space. Consequently, the GPUs will duplicate effort to create data that their peers have already created because they do not have access to a peer's frame buffer in peer address space where that information is stored. Alternatively, when a GPU completes processing of certain information that will be needed by a peer, the GPU may write that information to a commonly available system memory. The system memory is accessible by any of the GPUs connected to the interconnectivity fabric. However, using common system memory for such data transfers is time consuming and increases overhead processing. Invariably, the use of common system memory slows the graphics processing.

Therefore, there is a need in the art for an improved method and apparatus of transferring information from peer-to-peer within a computing environment.

BRIEF SUMMARY OF THE INVENTION

Embodiments of the present invention provide methods and apparatus for peer-to-peer data transfers in a computing environment with configurable control over the number of outstanding read requests by one peer device to another. A requesting peer device includes a control register that stores a high-watermark value associated with requests to a target peer device. Each time a read request to the target peer device is generated, the number of such requests already outstanding is compared to the high-water mark. The request is blocked if the number of outstanding requests exceeds the high-water mark and remains blocked until such time as the number of outstanding requests no longer exceeds the high-water mark. Different high-water marks can be associated with different combinations of requesting and target devices. In some embodiments, the high-water marks are used to avoid deadlock conditions that can arise when peer devices are making numerous read requests of each other.

According to one aspect of the present invention, a method for making peer-to-peer read requests between peer devices in a computing environment is provided. A first read request in a requesting one of the peer devices, the first read request targeting a first target one of the peer devices. It is determined whether a first number of outstanding read requests by the requesting device to the first target device exceeds a first high-water mark. The first read request is blocked within the requesting device in response to determining that the first number of outstanding read requests exceeds the first high-water mark and remains blocked until the first number of outstanding read requests no longer exceeds the first high-water mark. The first read request is executed in response to determining that the first number of outstanding read requests does not exceed the first high-water mark.

In some embodiments, executing the first read request may include converting the first read request to a first write request packet; transmitting the first write request packet to the first target device; and receiving, in response to the first write request packet, a completion packet from the first target device, the completion packet including read data requested in the first read request. The first number of outstanding read requests can be incremented in response to converting the first read request and decremented in response to receiving the completion packet.

Where more than two peer devices are present, a second read request targeting a second target device can be generated in the requesting device. It is determined whether a second number of outstanding read requests by the requesting device to the second target device exceeds a second high-water mark. In response to determining that the second number of outstanding read requests exceeds the second high-water mark, the second read request is blocked within the requesting device and remains blocked until the second number of outstanding read requests no longer exceeds the second high-water mark. The second read request is executed in response to determining that the second number of outstanding read requests does not exceed the second high-water mark. The first and second high-water marks can be the same or different and may be based, e.g., on a number of entries included in an incoming read request queue in the respective target devices and/or a latency of an interconnectivity fabric via which the requesting device communicates with the various target devices.

According to another aspect of the present invention, a device for use in a computing environment includes request generation logic, request tracking logic, a fabric interface, a control register, and control logic coupled between the request generation logic and the fabric interface. The request generation logic is configured to generate peer-to-peer read requests including a first read request targeting a first peer device. The request tracking logic is configured to report a number of outstanding read requests by the device to the first peer device. The fabric interface is configured to communicate with an interconnectivity fabric connecting the device to one or more peer devices including the first peer device. The control register configured to store a high-water mark. The control logic is configured to block the first read request from being forwarded to the fabric interface for transmission into the interconnectivity fabric in the event that the number of outstanding read requests exceeds the high-water mark, with the first read request remaining blocked until first number of outstanding read requests no longer exceeds the high-water mark.

The device may also be able to receive read requests, in which case the device advantageously also includes a read mailbox and read servicing logic. The read mailbox is configured to queue read requests received from the one or more peer devices via the fabric interface. The read servicing logic is configured to generate a completion packet in response to each read request queued in the read mailbox and to forward each completion packet to the fabric interface. The fabric interface transmits each completion packet generated by the read servicing logic into the interconnectivity fabric.

According to yet another aspect of the present invention, a computer system includes two or more peer devices and an interconnectivity fabric supporting peer-to-peer communication among the peer devices. Each peer device includes request generation logic, request tracking logic, a fabric interface, a first control register, and control logic coupled between the request generation logic and the fabric interface. The request generation logic is configured to generate read requests including a first read request targeting a first target one of the peer devices. The request tracking logic is configured to report a first number of outstanding read requests by the one of the peer devices to the first target device. The fabric interface is configured to communicate with the interconnectivity fabric. The first control register configured to store a first high-water mark defining a maximum number of outstanding requests by the one of the peer devices to the first target device. The control logic is configured to block the first read request from being forwarded to the fabric interface in the event that the first number of outstanding read requests exceeds the first high-water mark, with the first read request remaining blocked until the first number of outstanding read requests no longer exceeds the first high-water mark.

The following detailed description together with the accompanying drawings will provide a better understanding of the nature and advantages of the present invention.

DETAILED DESCRIPTION OF THE INVENTION

Embodiments of the present invention provide methods and apparatus for peer-to-peer data transfers in a computing environment with configurable control over the number of outstanding read requests by one peer device to another. A requesting peer device includes a control register that stores a high-watermark value associated with requests to a target peer device. Each time a read request to the target peer device is generated, the number of such requests already outstanding is compared to the high-water mark. The request is blocked if the number of outstanding requests exceeds the high-water mark and remains blocked until such time as the number of outstanding requests no longer exceeds the high-water mark. Different high-water marks can be associated with different combinations of requesting and target devices. In some embodiments, the high-water marks are used to avoid deadlock conditions that can arise when peer devices are making numerous read requests of each other.

Computing Environment

Figure 1:
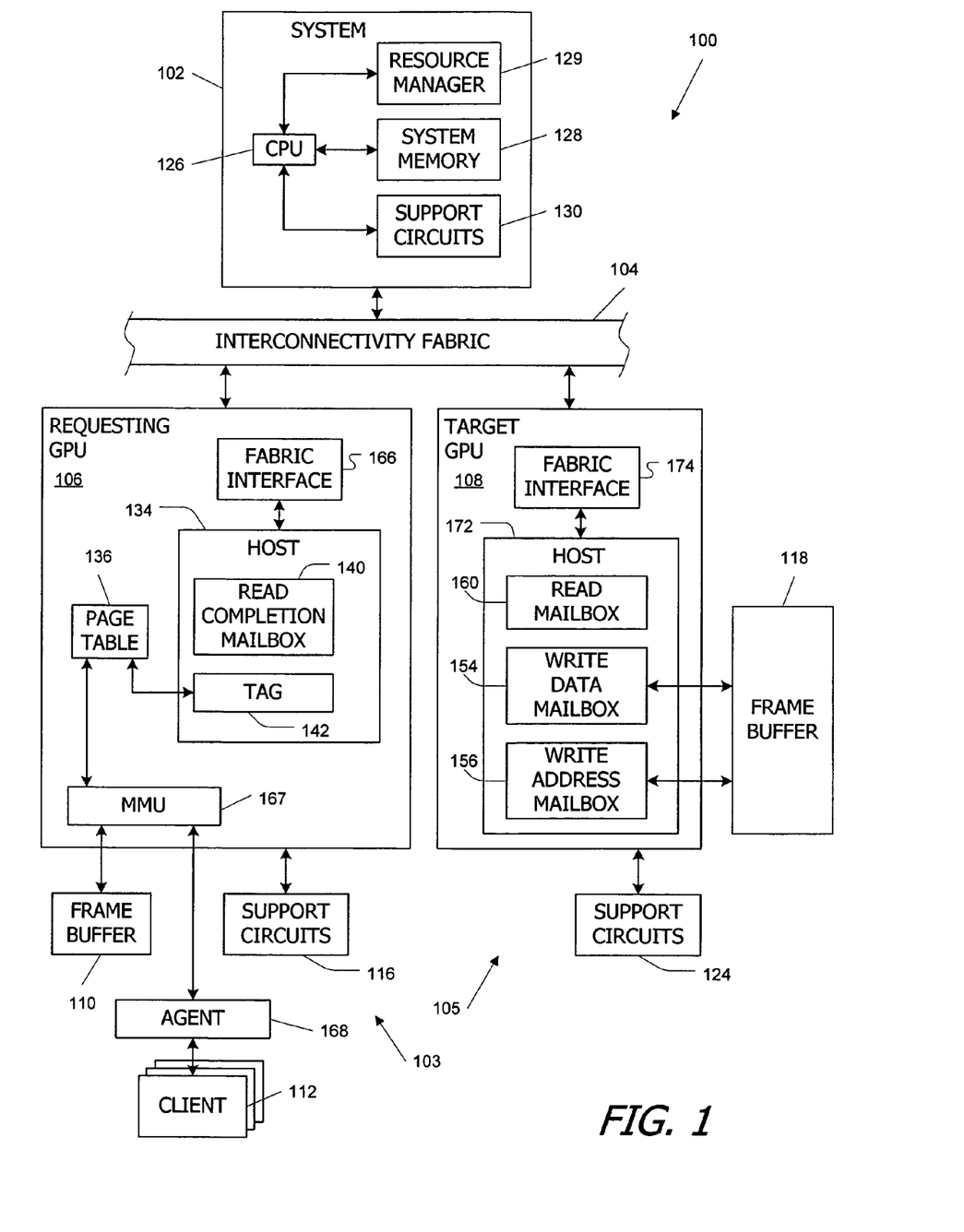
FIG. 1 is a high-level block diagram of a computing environment within which an embodiment of the present invention may be practiced.

FIG. 1 depicts a computing environment 100 within which an embodiment of the present invention may be practiced. Computing environment 100 includes a system level computer 102, interconnectivity fabric 104, and peer devices 103 and 105. The peer devices are depicted in FIG. 1 as including graphics processing units (GPUs) 106 and 108, but it is to be understood that peer devices may also be implemented as any form of computing device including computer systems, network appliances, storage devices, integrated circuits, microcontrollers, and the like, without departing from the scope of the present invention. Further, although two devices 103 and 105 are depicted, those skilled in the art will understand that the invention is applicable to any number of devices. As described below, the invention provides a method and apparatus that facilitates data transfer between the peer devices 103 and 105.

System computer 102 is a general processing computer system that includes a central processing unit (CPU) 126, system memory 128, a resource manager 129, and support circuits 130. In one embodiment of the invention, system computer 102 is the "mother board" of a computer or server. System computer 102 uses devices 103 and 105 to provide specific types of computing (e.g., graphics processing). CPU 126 may be any form of general purpose microprocessor or microcontroller. System memory 128 may include random access memory, read only memory, removable storage, disk drive storage, and/or any combination of memory devices. Resource manager 129 allocates address space to devices, such as devices 103 and 105, within computing environment 100 and generates a memory map for the system memory 128. Support circuits 130 may include well known circuits used to facilitate functionality of computer system 102, such as clock circuits, cache, power supplies, interface circuitry and the like.

Interconnectivity fabric 104 (also referred to herein as the "fabric") may include any device(s) that enable data to be transferred from one peer device 103 (or 105) to another peer device 105 (or 103) or to system memory 128. For instance, fabric 104 can include an advance switching network or a bridge device supporting AGP, PCI-Express™ bus or PCI bus protocols, HyperTransport™ or any other connectivity device(s) or circuits that may be used to interconnect peer devices. An example of interconnectivity fabric 104 known in the art is the Intel® Northbridge.

Although in FIG. 1, peer device 103 differs from peer device 105, in some embodiments of the present invention, the logic and software of each peer device 103 and 105 may be identical. Peer device 103 includes a requesting GPU 106 coupled to a frame buffer 110, an agent 168, and support circuits 116. Within requesting GPU 106 are a memory management unit (MMU) 167, a fabric interface 166, a page table 136, and host logic 134. Fabric interface 166 couples host logic 134 to the fabric 104. Host logic 134 (or in some embodiments fabric interface 166) includes a read completion mailbox 140 and a tag 142. Frame buffer 110 may be any form of random access memory and may have a very large capacity, e.g., on the order of two or more gigabytes. Memory management unit 167 couples frame buffer 110 and agent 168 to other units within requesting GPU 106. Agent 168 interfaces between requesting GPU 106 and one or more clients 112 (e.g., processes or hardware within the computing environment). Support circuits 116 may include well known circuits that facilitate the functionality of requesting GPU 106 such as clock circuits, interface hardware, power supplies, and the like.

Peer device 105 includes a target GPU 108 coupled to a frame buffer 118 and support circuits 124. Frame buffer 118 may be any form of random access memory and may have a very large capacity, e.g., on the order of two or more gigabytes. Within target GPU 108 is a fabric interface 174 and host logic 172. Fabric interface 174 couples host logic 172 to fabric 104. Host logic 172 includes a read mailbox 160, a write data mailbox 154, and a write address mailbox 156. Support circuits 124 may include well known circuits that facilitate the functionality of target GPU 108 such as clock circuits, interface hardware, power supplies, and the like.

In operation, a data transfer process begins with one of clients 112 requesting access to data within a frame buffer 110 or 118. Client 112 communicates the request to agent 168 that is executing on requesting GPU 106. Agent 168 communicates with memory management unit 167, which determines if the request requires access to a local frame buffer, such as frame buffer 110, or if the request requires access to a peer frame buffer, such as frame buffer 118.

In a computer environment that allows clients 112 to access data within a peer frame buffer 118, page table 136 can be adapted to indicate which physical memory address in peer frame buffer 118 is accessed for a particular virtual address corresponding to the read or write request from the client 112. Page table 136 is advantageously generated by resource manager 129 during initialization to reflect the memory mapping, e.g. local, system, peer, or the like. An attribute field within page table 136 identifies whether the data is associated with local frame buffer 110, associated with system memory 128, associated with peer frame buffer 118, or not associated with a memory. As described above, memory management unit 167 uses page table 136 to determine if the read or write address for the data associated with the read or write request from client 112 is within peer frame buffer 118.

More specifically, information for identifying and decoding information in a local or remote frame buffer is stored in entries in page table 136 used by the requesting peer device 103. The page table entries are maintained by resource management software and interpreted by memory management unit 167. In one embodiment, the physical address and data type of each page referenced in a request from client 112 are stored by resource manager 129 in page table 136. This information is used by target peer device 105 to provide the data in an appropriate form to requesting peer device 103. For purposes of this description, "data type" may include, without limitation, endian ordering, compression format, data structure organization, information related to how the data is specified, any information related to how the data will be referenced or translated when fetched from or stored in local, system or peer address space, or any combination thereof.

Peer-to-Peer Data Sharing

Figure 2:
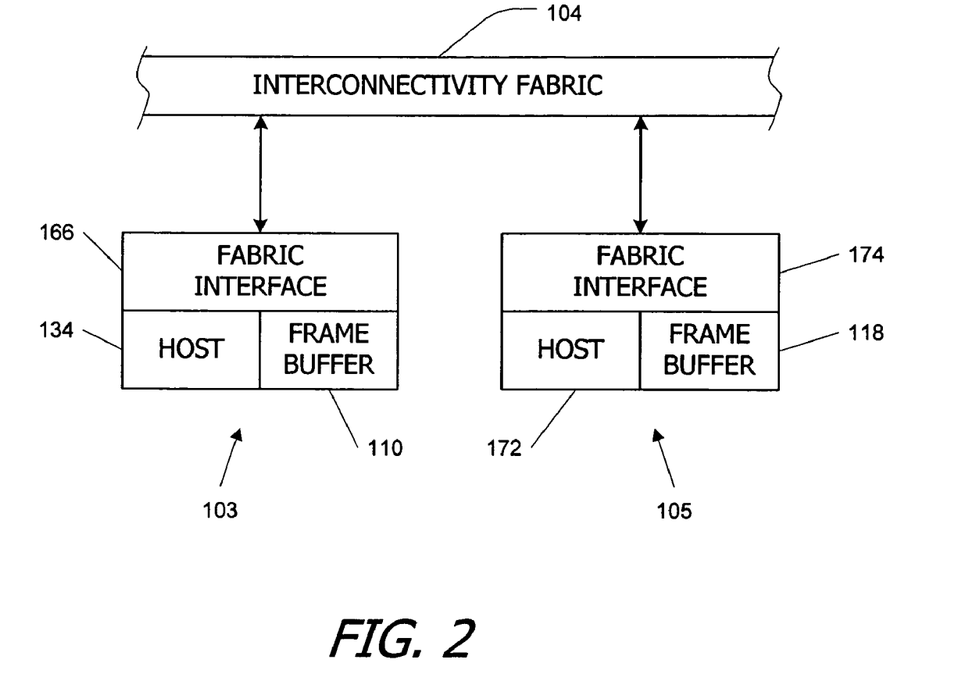
FIG. 2 is a simplified block diagram of a portion of the computing environment of FIG. 1.

FIG. 2 is a simplified block diagram of a portion of computing environment 100 of FIG. 1, specifically showing interconnectivity of peer devices 103 and 105. This interconnectivity enables peer device 103 to access (read or write) frame buffer 118 of peer device 105 without modification to fabric 104 or fabric interfaces 166, 174. Accordingly, fabric interfaces 166 and 174, as well as fabric 104 itself, can be implemented using a standard interconnectivity fabric and related interfaces that provide communication functionality between the peer devices 103, 105. More specifically, when a request from client 112 for data within peer frame buffer 118 is received by host logic 134, host logic 134 performs a translation of the data request into a protocol that is supported by a conventional fabric interface 166. Fabric interface 166 transfers the request (as translated) through fabric 104 to fabric interface 174 of peer device 105. Host logic 172 provides functionality to access frame buffer 118 within remote peer device 105, including translation of requests as appropriate.

For example, if client 112 coupled to peer device 103 requests a data transfer to or from frame buffer 118 within peer device 105, host logic 134 translates that request into a form that is understandable and is readily handled by fabric interface 166, fabric 104, and fabric interface 174. The request is then passed from peer device 103 to peer device 105 and is processed by host logic 172 within peer device 105. Host logic 172 provides access to frame buffer 118 such that the data will either be read or written, depending on the request, within peer device 105. If the request is a read request, the data from frame buffer 118 is sent from host logic 172 in such a manner that fabric interface 174, fabric 104, and fabric interface 166 accept and communicate the data to the peer device 103, where host logic 134 processes the data for delivery to the requesting client 112. In this manner, peer devices 103 and 105 can perform peer-to-peer data transfers without any modification to fabric interfaces 166, 174 or fabric 104. Consequently, peer devices in accordance with an embodiment of the present invention can communicate within computing environment 100 in a standard manner using standard communication protocols.

In one specific embodiment, fabric 104 and fabric interfaces 166, 174 support PCI or PCI-Express™. As is well known in the art, some fabric 104 implementations using PCI and PCI-Express™ communications protocols do not permit a read request to be communicated from peer to peer. However, those same fabric 104 implementations do permit a write request to be communicated from peer to peer. Such protocols may permit a peer device to write data to another peer's frame buffer but not permit a peer device to read data from another peer's frame buffer. In embodiments of the present invention, host logic 134, 172 in peer devices 103, 105 provides enhanced functionality resulting in the capability to read and write data between peer devices.

Read Transaction

Figure 3:
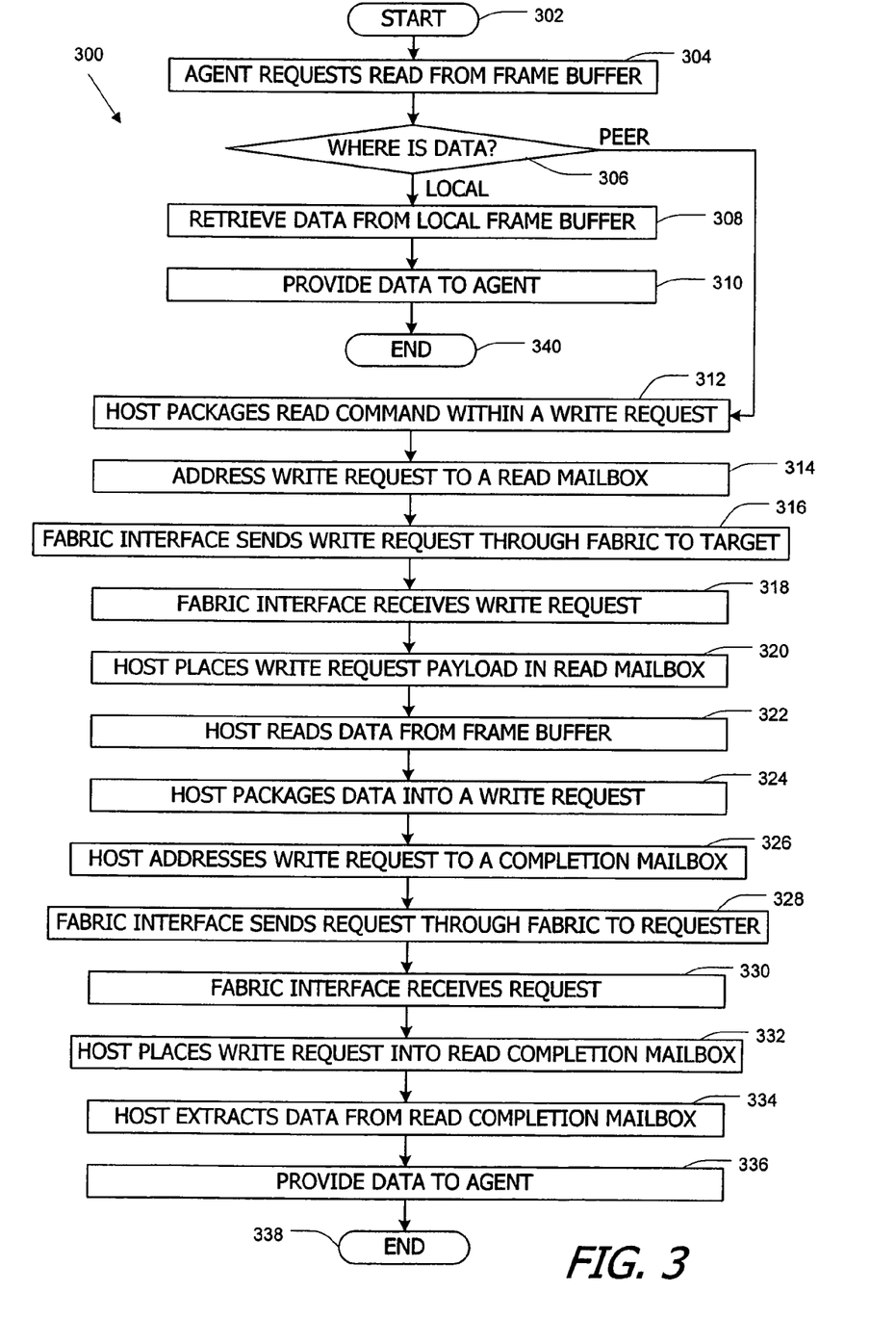
FIG. 3 is a flow diagram of a process for a peer-to-peer read transaction in the computing environment of FIG. 1.

FIG. 3 is a flow diagram of a process 300 for reading data in a computing environment from peer to peer in accordance with the present invention. The peer device that is making a read request is referred to herein as the "requesting device" (e.g., device 103 of FIG. 1) while the peer device that contains the information being requested is referred to herein as the "target device" (e.g., device 105 of FIG. 1). It is to be understood that the same peer device may act as a requesting device and also as a target device, depending on whether it is making or responding to a request.

Process 300 starts at step 302 and proceeds to step 304 where agent 168 of FIG. 1, in accordance with instructions from client 112, requests to read data from target frame buffer 118. At step 306, requesting device 103 determines where the data is located, e.g., by having memory management unit 167 access page table 136. If that data is locally stored, process 300 proceeds to step 308 where the data is retrieved from local frame buffer 110. The data is provided to the agent at step 310, and process 300 ends at step 340. In some embodiments, as a third alternative at step 306, the data may also be stored in system memory, in which case the data is retrieved from system memory and returned to the requesting agent. It should be noted that read requests for data that is stored locally or in system memory do not entail a peer-to-peer transaction.

On the other hand, if, at step 306, the data is determined to be located in target device 105, process 300 proceeds to step 312. At step 312, host logic 134 within requesting device 103 packages the read command from client 112 with the address and data type into a write request packet that is to be transmitted to target device 105. Such packaging is advantageously performed in instances where fabric 104 does not support peer-to-peer read request operations but does support peer-to-peer write requests. In one embodiment, host logic 134 packages into a write request packet the read command information including a command field, a physical address identifying where the data is located within peer frame buffer 118, the size of the data that is being requested, and the data type of that data (e.g., an identifier for the format used to encode the stored data). In one embodiment, host logic 134 may determine through memory management unit 167, the physical address of the data, the size of the data and the data type of the data from the page table 136. This read command information is placed in the payload section of the write request. A person skilled in the art will recognize that sending the physical address to target device 105 permits the read command to be processed by target device 105 without any address translation. In an alternative embodiment, the request is sent using a virtual address that can be translated by target device 105.

At step 314, host logic 134 addresses the write request packet, which contains the read request, to a read mailbox 160 within target device 105. In one embodiment, the read mailbox address is provided by resource manager 129. At step 316, fabric interface 166 sends the write request packet through fabric 104 to target device 105. At step 318, fabric interface 174 of target device 105 receives the write request packet.

At step 320, the payload is extracted from the write request packet by host logic 172 in target device 105, thereby converting the write request packet containing the read request into a read command. Host logic 172 places the read command into read mailbox 160, which is advantageously implemented as a first in first out (FIFO) buffer or other queue having a depth that is commensurate with the maximum number of transactions that requesting device 103 is allowed to have outstanding to target device 105. Read mailbox 160 holds each read command until it is processed by target device 105.

At step 322, host logic 172 removes the read command from read mailbox 160 and reads the data from frame buffer 118 in accordance with the read command and data type. At step 324, host logic 172 packages the retrieved data into a completion packet, which is transmitted as a write request packet that is consistent with the protocol supported by fabric 104. Host logic 172 addresses the write request packet to read completion mailbox 140 within requesting device 103 at step 326. At step 328, fabric interface 174 sends the write request packet carrying the retrieved data through fabric 104 to master device 103.

At step 330, fabric interface 166 receives the write request packet that carries the retrieved data. At step 332, host logic 134 within master device 103 places the write request packet into read completion mailbox 140. At step 334, host logic 134 extracts the data from read completion mailbox 140 and provides that data, at step 336, to client 112 via agent 168. The process ends at step 338.

When write request packets are placed into read completion mailbox 140 at step 332, tracking logic underlying read completion mailbox 140 is used to track outstanding read requests and to match those outstanding requests with the read completion packets returned from the target device 105. For instance, the tracking logic may store information identifying the client 112 that originated each request in order to return read data to the appropriate client 112. In some embodiments of the present invention, read completion mailbox 140 includes storage resources, e.g., registers, RAM, or the like, that are reserved as needed by the tracking logic for storing retrieved data prior to transferring it to client 112. In one embodiment, in host logic 134, a tag is generated when a read request is issued, and that tag is matched against a read completion tag that is received with the data written into read completion mailbox 140. Where multiple clients 112 may be making read requests through agent 168 to the various frame buffers or other memories within computing environment 100, it is helpful to track the issuance and completion of read requests to avoid possible errors.

In accordance with process 300, a peer-to-peer read transaction can be performed even where the interconnectivity fabric does not support such a transaction, without modifying the standard communication protocol used by the fabric or supported in the specific implementation of the fabric.

Although peer-to-peer write transactions between peer devices 103 and 105 are not specifically described herein, it is to be understood that such transactions can be supported, e.g., using conventional interconnectivity protocols that support peer-to-peer write requests. An example of a process that may be used for performing peer-to-peer write transactions is described in above-referenced application Ser. No. 11/005, 150, and application Ser. No. 11/005,451. In a write transaction, the write request packet carrying the data to be written is advantageously delivered to the target device but not to the read mailbox described above.

Deadlock Avoidance

Referring to FIG. 1, it is to be understood that although requesting peer device 103 is shown as having logic for making read requests while target peer device 105 is shown as having logic for responding to read requests, requests can in fact be made in either direction. For instance, each host 134, 172 can have its own read completion mailbox that receives read completion packets from peer devices and its own read mailbox that receives read requests from peer devices.

Figure 4:
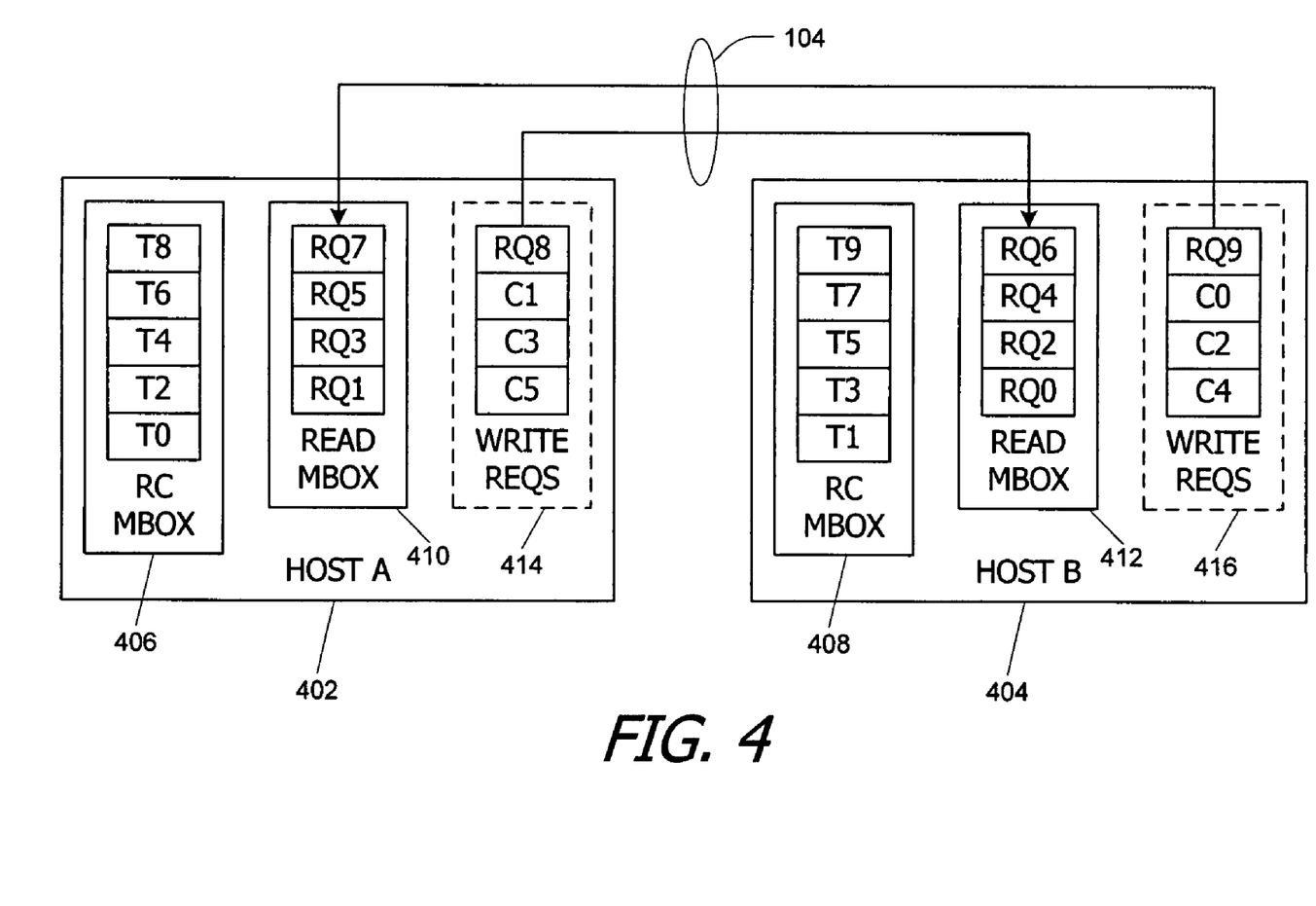
FIG. 4 is a simplified block diagram showing two peer devices communicably coupled but in a deadlock condition.

More specifically, FIG. 4 shows a first host ("Host A") 402 and a second host ("Host B") 404 communicably coupled via fabric 104. It is to be understood that while fabric 104 is represented in FIG. 4 by arrows connecting respective mailboxes of hosts 402, 404, a direct connection is not required, and any interconnectivity fabric may be used as described above.

Each host 402, 404 has a respective read completion (RC) mailbox 406, 408 (similar to read completion mailbox 140 of FIG. 1) and a read mailbox 410, 412 (similar to read mailbox 160 of FIG. 1). In accordance with process 300 described above, host A 402 can send read requests packaged as write request packets to read mailbox 412 of host B 404, and host B 404 can send read requests packaged as write request packets to read mailbox 410 of host A 402. In response to requests from host A 402, host B 404 sends read completions packaged as write request packets to read completion mailbox 406 of host A 402, and in response to requests from host B 404, host A sends read completions packaged as write request packets to read completion mailbox 408 of host B 404.

As is known in the art, some interconnectivity fabric protocols, such as PCI and PCI-Express™, require that write packets be transmitted without delay. That is, host A 402 can send a write request packet addressed to read mailbox 412 into interconnectivity fabric 104 only when read mailbox 412 is able to receive the write packet without delay. Similarly, host B 404 can send a write request packet addressed to read mailbox 410 into interconnectivity fabric 104 only when read mailbox 414 is able to receive the write packet without delay. Where both hosts 402, 404 are generating read requests, this requirement can lead to deadlock, as FIG. 4 illustrates.

More specifically, host A 402 is shown as having a queue 414 of outgoing write request packets, and host B 404 is shown as having a queue 416 of outgoing write request packets. Queues 414, 416 are shown to facilitate understanding of the present invention by illustrating a list of pending write requests that each host 402, 404 has committed to transmitting in a particular order but has not yet sent to the fabric interface. It is to be understood that a single physical queue structure is not required, and the pending requests illustrated by queues 414, 416 may in fact be held anywhere in the peer device of which host A 402 or host B 404 is a part. In some instances, the requests may be held in the form of read commands.

In this example, host A 402 has already sent several read requests (RQ0, RQ2, RQ4, RQ6) to host B 404; these requests are queued in read mailbox 412 of host B 404, where they remain until host B 404 sends corresponding read completions (C0, C2, C4, etc.) to read completion mailbox 406 of host A 402. In an alternative scenario, host B 404 removes read requests from read mailbox 412 when it processes the request, which occurs when there are no previous pending write requests to be sent. In this example, read completion mailbox 406 has tags (T0, T2, T4, etc.) that will be used to match received read completions to the original read requests.

Similarly, host B 404 has already sent several read requests (RQ1, RQ3, RQ5, RQ7) to host A 402; these requests are queued in read mailbox 410 of host A 402, where they remain until host A 402 sends corresponding read completions (C1, C3, C5, etc.) to read completion mailbox 408 of host B 404. In this example, read completion mailbox 404 has tags (T1, T3, T5, etc.) that will be used to match received read completions to the original read requests.

Host A 402 has a further read request RQ8 at the head of its outgoing write packet queue 414. This signifies that request RQ8 is next to be transmitted and will be transmitted as soon as read mailbox 412 of host B 404 has space to accept it. Behind read request RQ8 in queue 414 are completions C1, C3, C5 corresponding to requests RQ1, RQ3, and RQ5 respectively.

Similarly, host B 404 has a further read request RQ9 at the head of its outgoing write packet queue 416, signifying that request RQ9 is next to be transmitted and will be transmitted as soon as read mailbox 410 of host A 402 has space to accept it. Behind read request RQ9 in queue 414 are completions C0, C2, C4 corresponding to requests RQ0, RQ2, and RQ4 respectively.

In this situation, hosts 402 and 404 are deadlocked because neither request RQ8 nor request RQ9 can move. Read mailbox 412 is full, and request RQ8 cannot be sent until read mailbox 412 has space to accept it, which means that request RQ0 must be removed from read mailbox 412 before request RQ8 can be sent. Request RQ0 will not be removed until completion C0 is sent. Completion C0 is in outgoing write packet queue 416 behind request RQ9. But read mailbox 410 is also full, and request RQ9 cannot be sent until read mailbox 410 has space to accept it, which means that request RQ1 must be removed from read mailbox 410 before request RQ9 can be sent. Request RQ1 will not be removed until completion C1 is sent. Completion C1 is in outgoing write packet queue 414 behind request RQ8, which cannot be sent for the reasons just described. Thus, hosts A 402 and B 404 are deadlocked, with neither host being able to send further write request packets to the other.

It should be understood that whether deadlock will actually occur in a particular computing environment depends on a number of factors. For instance, if read requests are being made in only one direction, the situation depicted in FIG. 4 will not come to pass. If the rate at which read requests are made is sufficiently slow, or if the FIFOs in the read mailboxes are sufficiently deep, deadlock can also be avoided. Such factors, however, are generally dependent on how users and application programmers configure and operate the computing environment.

In accordance with an embodiment of the present invention, deadlock between peer devices can be avoided by preventing a read request that cannot immediately be delivered from entering the queue of outgoing write requests.

Figure 5:
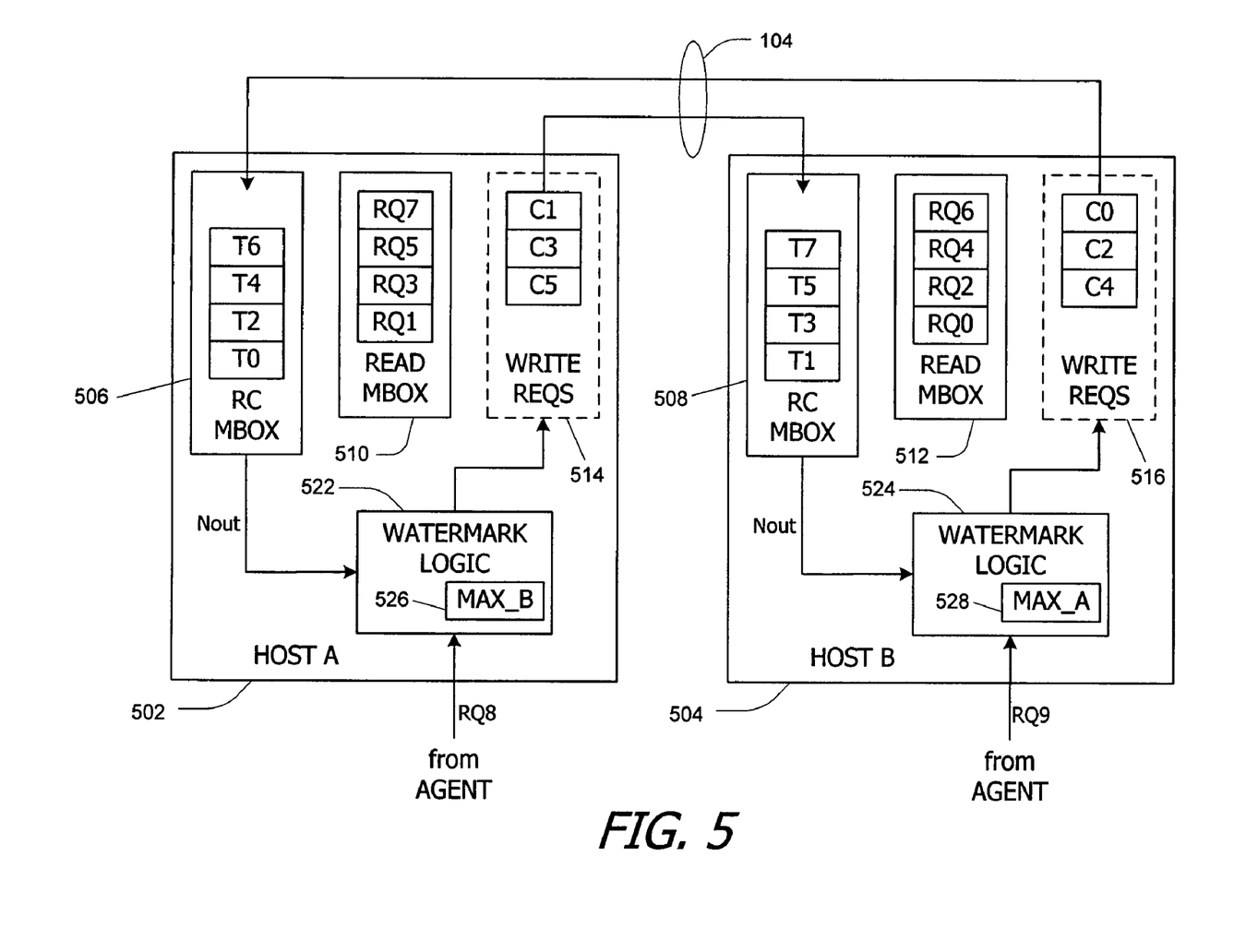
FIG. 5 is a simplified block diagram showing two peer devices with deadlock avoidance logic according to an embodiment of the present invention.

FIG. 5 illustrates host A 502 and host B 504 with deadlock avoidance logic according to an embodiment of the present invention. FIG. 5 is generally similar to FIG. 4, with each host 502, 504 having a respective read completion (RC) mailbox 506, 508, a respective read mailbox 510, 512, and a respective outgoing write packet queue 514, 516, which may be similar or identical to corresponding structures described above. As noted above, outgoing write packet queues 514, 516 need not be implemented as distinct physical structures; these queues are shown herein to facilitate understanding of the present invention by illustrating a list of write requests that each host 502, 504 has committed to delivering in a particular order.

In this embodiment, deadlock avoidance is implemented using watermark logic 522, 524 in each host 502, 504. Watermark logic 522, 524 detects when a read request (e.g., RQ8, RQ9) received from the agent (see FIG. 1) cannot be accepted into the intended read mailbox 510, 512 and stalls the request before it enters outgoing write request queues 514, 516.

In one embodiment, watermark logic 522, 524 includes a register 526, 528 that stores a "high-water mark" value (MAX_B, MAX_A) representing the maximum number of read requests that can be outstanding to a particular targeted device. The current number of outstanding requests (Nout) is determined, e.g., by counting the number of tags in read completion mailbox 506, 508. Watermark logic 522, 524 compares the number of outstanding requests Nout to the high-water mark and determines whether it is safe to proceed with the request. If it is not safe, watermark logic 522, 524 instructs the agent to hold the request until such time as it becomes safe.

Figure 6:
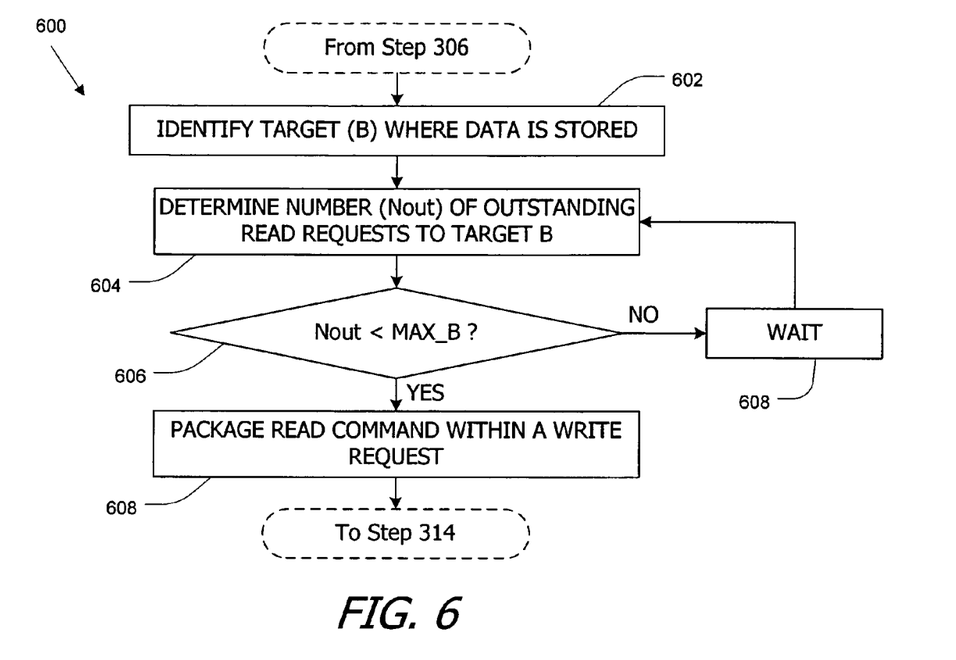
FIG. 6 is a flow diagram showing a control process for avoiding deadlock in peer devices according to an embodiment of the present invention.

FIG. 6 is a flow diagram showing a control process 600 implemented in watermark logic 522 according to an embodiment of the present invention. While the control process is described herein with specific reference to watermark logic 522, it is to be understood that a similar process can be implemented in watermark logic 524. The control process may be included, e.g., at step 312 of process 300 of FIG. 3 described above. As described above, step 312 is reached if it is determined at step 306 that the data is located in a peer device.

Referring to FIG. 6, at step 602, the target, i.e., the peer device where the data to be read is stored, is identified. In one embodiment, an identifier of the target device is advantageously included in information provided to watermark logic 522 by agent 168 of FIG. 1. (In the case of request RQ8 of FIG. 5, the target is host B 504.) At step 604, the number Nout of outstanding requests directed to that target is determined; in the example shown in FIG. 4, Nout is 4. In one embodiment, read completion mailbox 506 includes conventional occupancy counters that can determine the number Nout.

At step 606, the number Nout of outstanding requests is compared to the high-water mark MAX_B stored in register 526. The high-water mark MAX_B is advantageously equal to or somewhat less than the number of entries in read mailbox 512; for read mailbox 512 shown in FIG. 5, MAX_B might be 4.

If Nout is less than MAX_B, process 600 proceeds to step 608 to package the read request RQ8 within a write request packet, e.g., as described above with reference to step 312 of process 300 in FIG. 3, then proceeds with step 314 and the rest of process 300.

If, however, it is determined at step 606 that Nout is not less than MAX_B, as is the case in FIG. 5 with MAX_B=4 and Nout=4, process 600 enters a waiting period at step 608. The waiting period may last for some number of cycles of a control clock of host A 502. It is to be understood that the waiting period may be as long or short as desired, and in some embodiments, the waiting period may be of effectively zero duration (e.g., if the number Nout is re-checked on every clock cycle).

After the waiting period, process 600 returns to step 604 to update the number Nout of outstanding requests, then repeats the test at step 606 again. Thus, watermark logic 522 advantageously continues to hold back ("block") the read request until the number of outstanding requests is sufficiently low that space for the new request in read mailbox 512 is guaranteed.

For instance, referring to FIG. 5, request RQ8 would held back by watermark logic 522 until at least one of the outstanding requests RQ0, RQ2, RQ4, RQ6 is completed. Similarly, request RQ9 would be held back by watermark logic 524 until at least one of the outstanding requests RQ1, RQ3, RQ5, RQ7 is completed. When completion C0 is sent by host B 504, request RQ0 can be removed from read mailbox 512, making space for request RQ8. When completion C0 is received at read completion mailbox 506, the number of outstanding requests decrements to 3; only then does watermark logic 522 permit request RQ8 to proceed. Likewise, when completion C1 is sent by host A 502, request RQ1 can be removed from read mailbox 510, making space for request RQ9. Accordingly, deadlock is avoided because requests RQ8 and RQ9 do not block the sending of completions C1 and C0.

It will be appreciated that the control process described herein is illustrative and that variations and modifications are possible. Steps described as sequential may be executed in parallel, order of steps may be varied, and steps may be modified or combined. As noted above, the waiting period can have any length desired, including effectively zero length. Depending on how the high-water mark is defined, the "less than" test at step 606 may also be defined to include the case where the number of outstanding requests is equal to the high-water mark.

The high-water mark may have any value, provided that it does not exceed the number of requests that can simultaneously be present in the target device's read mailbox. In one embodiment, the high-water mark is set equal to the number of entries in the target's read mailbox FIFO. In another embodiment, the high-water mark is set to a somewhat lower value, e.g., to allow for signal propagation delays that may produce transient inaccuracy in the count of outstanding requests or the like. In some embodiments, performance may be improved by setting the high-water mark to a value that is less than (rather than equal to) the number of entries in the target's read mailbox FIFO, and performance can be tuned by adjusting the high-water mark.

It should be noted that the high-water marks stored by different hosts need not be equal. For instance, hosts A 502 and B 504 might have different designs including different depths of their read mailboxes 510, 512; the high-water mark in each case is advantageously selected according to the target's read mailbox depth.

In some embodiments, the high-water mark is assigned a value at system initialization. For instance, a graphics driver program executing on CPU 126 of system 100 (see FIG. 1) may be programmed to collect information from each device 103, 105 indicating the depth of its read mailbox. Based on this information, the graphics driver program stores a suitable high-water mark value in each host's watermark register.

Systems with More than Two Peers

Figure 7:
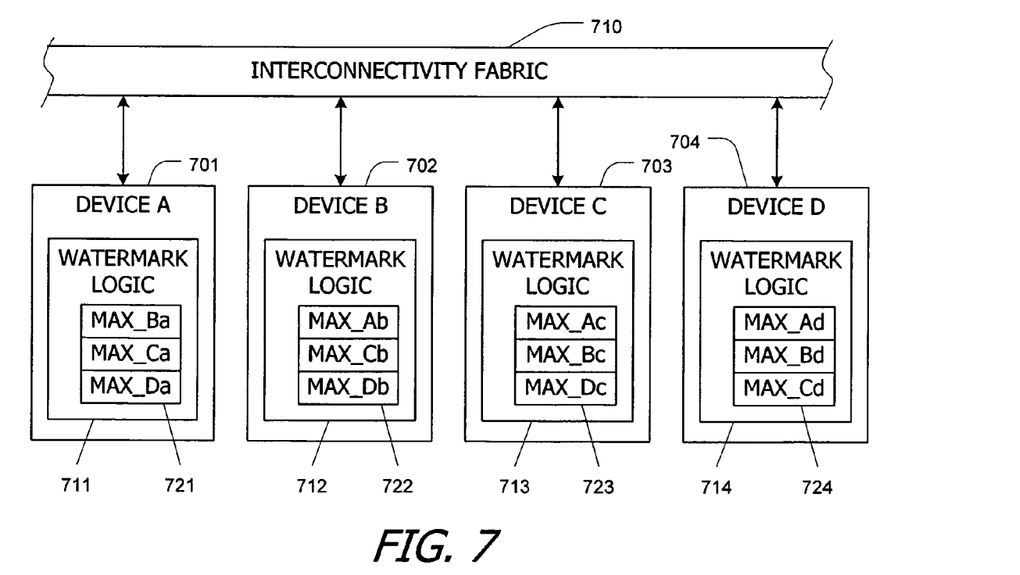
FIG. 7 is a simplified block diagram showing four peer devices communicating via an interconnectivity fabric according to an embodiment of the present invention.

The watermark logic described herein can also be extended to peer-to-peer communications involving more than two peers. FIG. 7 illustrates a portion of a computing environment with four peer devices 701-704 communicating via an interconnectivity fabric 710, which may be generally similar to fabric 104 described above. Peer devices 701-704 are generally similar to peer devices 103-105 described above; in particular, each peer device has host logic similar to host logic 502, 504 shown in FIG. 5. Any one of peer devices 701-704 may read data from or write data to any other one of peer devices 701-704 using techniques generally similar to those described above.

In particular, each peer device 701-704 advantageously includes a watermark logic unit 711-714. Each watermark logic unit 711-714 has registers 721-724 that store a high-water mark for each peer device that can be a target of a request, in this case all other peer devices 701-704. For example, register 721 of device 701 stores separate high-water marks for peer device 702 (MAX_Ba), peer device 703 (MAX_Ca) and peer device 704 (MAX_Da). Similarly, register 722 of device 702 stores separate high-water marks for peer device 702 (MAX_Ab), peer device 706 (MAX_Cb) and peer device 708 (MAX_Db), and so on. (Herein, each high-water mark MAX is distinguished by a capital letter corresponding to the target device and a lower-case letter corresponding to the requesting device.)

Each of watermark logic units 711-714 advantageously operates in accordance with process 600 of FIG. 6 described above. In this context, the number Nout of outstanding requests is advantageously determined separately by the requesting device for each possible target device; for instance, device 701 would maintain separate counts of outstanding requests to devices 702, 703, and 704. At step 606, the comparison is made on a target-specific basis. That is, if device 701 is making a read request to device 702, the number of outstanding read requests to device 702 is compared to the watermark MAX_Ba applicable to device 702; if device 702 is making a read request to device 703, the number of outstanding read requests to device 703 is compared to the high-water mark MAX_Cb applicable to device 703; and so on.

In some embodiments, the host logic in each peer device 701-704 issues requests in the order they were received. In such embodiments, whenever the watermark logic blocks a read request to one target device, all subsequent read requests are also blocked, regardless of which device they target. For example, if watermark logic 711 in device 701 blocks a read request targeting device 702, then watermark logic 711 would also block any subsequent read requests, including read requests targeting device 703 or device 704, until such time as the read request targeting device 702 can proceed.

In other embodiments, requests to different targets are not required to stay in order relative to each other. In such embodiments, the watermark logic may block a request to one target device while allowing subsequent requests to other target devices to proceed. For example, if watermark logic 711 in device 701 blocks a read request targeting device 702, watermark logic 711 may allow a subsequent read request targeting device 703 or device 704 to proceed while the read request targeting device 702 remains blocked. It should be understood that a read request targeting device 703 (or device 704) might still be blocked by watermark logic 741 based on the number of outstanding requests to device 703 (or device 704).

As FIG. 7 shows, a high-water mark can be stored for every possible combination of requesting device and target device. Within any one peer device, e.g., device 701, watermark registers 721 may store different high-water marks for different target devices. Thus, within registers 721, MAX_Ba, MAX_Ca and MAX_Da may all be different values. Further, watermark registers in different requesting devices that relate to the same target device may also store different high-water mark values; for instance, MAX_Ba in registers 721 might or might not be equal to MAX_Bc in registers 723.

As in the two-peer case described above, the high-water marks for each requester-target pair of peer devices can be determined during system initialization and loaded into registers 721-724. In one embodiment, for each target device, the graphics driver determines the depth of its read mailbox and divides that depth by the total number of other peer devices to determine a high-water mark that applies to any requesting peer making a request of that target device. For example, if the depth of the read mailbox in peer device 701 is $N_A$ requests, the driver might define MAX_Ab=MAX_Ac=MAX_Ad= $[N_A/3]$, where $[N_A/3]$ represents the largest integer that is less than or equal to $N_A/3$. Thus, even if every one of peer devices 702-704 has the maximum number of requests outstanding to target peer device 701, deadlock will not occur.

More generally, high-water marks can be defined in any manner desired so long as the sum of the high-water marks for different requesters targeting the same device does not exceed the depth of the target device's read mailbox. As long as this is the case, even if every one of the peer devices reaches the high-water mark for outstanding requests to all other peer devices, deadlock will not occur.

It should be noted that the peer devices may be identical or different. For instance, peer devices 702, 704, 706, 708 could be heterogeneous GPUs or other heterogeneous I/O devices with different host logic. In particular, the depths of the read mailbox or other aspects of the host logic in different peer device may be different. Those skilled in the art will recognize that for each peer, regardless of the depth of its read mailbox, a high-water mark for use by other peers may be determined.

In some embodiments, the high-water mark for a particular combination of requesting device and target device may be based on other factors in addition to the read mailbox depth in the target device. For example, the latency between different pairs of peer devices might be different, affecting the number of requests that it is desirable to have in flight concurrently.

Figure 8A:
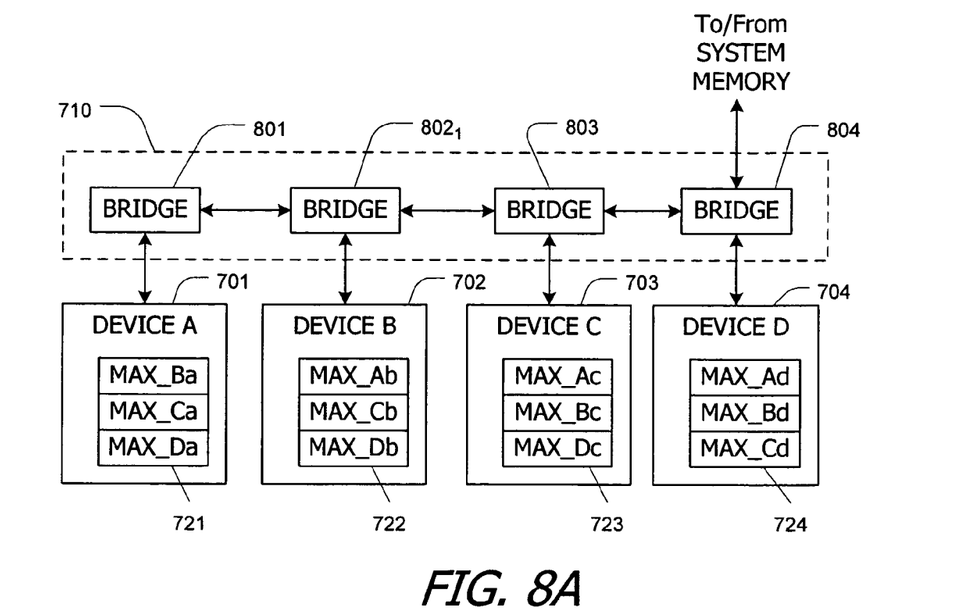
FIGS. 8A and 8B are simplified block diagrams showing structures of the interconnectivity fabric that may be present in alternative embodiments of the present invention.

FIG. 8A is a simplified block diagram showing a possible structure of interconnectivity fabric 710 of FIG. 7 that may be present in an embodiment of the present invention. In this embodiment, interconnectivity fabric 710 includes bridges 801-804 arranged in a daisy chain that connects at one end (directly or indirectly) to system memory, e.g., system memory 128 of FIG. 1. Bridges 801-804 may be of generally conventional design.

Those skilled in the art will recognize that the latency for communications between two of peer devices 701-704 in this embodiment depends on the number of bridges 801-804 that are traversed. For instance, a request from device 701 to device 704 traverses all four bridges 801, 802, 803 and 804, while a request from device 703 to device 704 traverses only two bridges 803 and 804. Because the latency from device 701 to device 704 is longer than the latency from device 703 to 704, it may be desirable to allow more requests to be in flight between devices 701 and 704 than between devices 703 and 704. This preference can be accommodated by making MAX_Da larger than MAX_Dc, while maintaining the property that the sum of MAX_Da, MAX_Db, and MAX_Dc does not exceed the total depth of the read mailbox in device 704. Similar logic can be applied to other requester/target pairs.

Figure 8B:
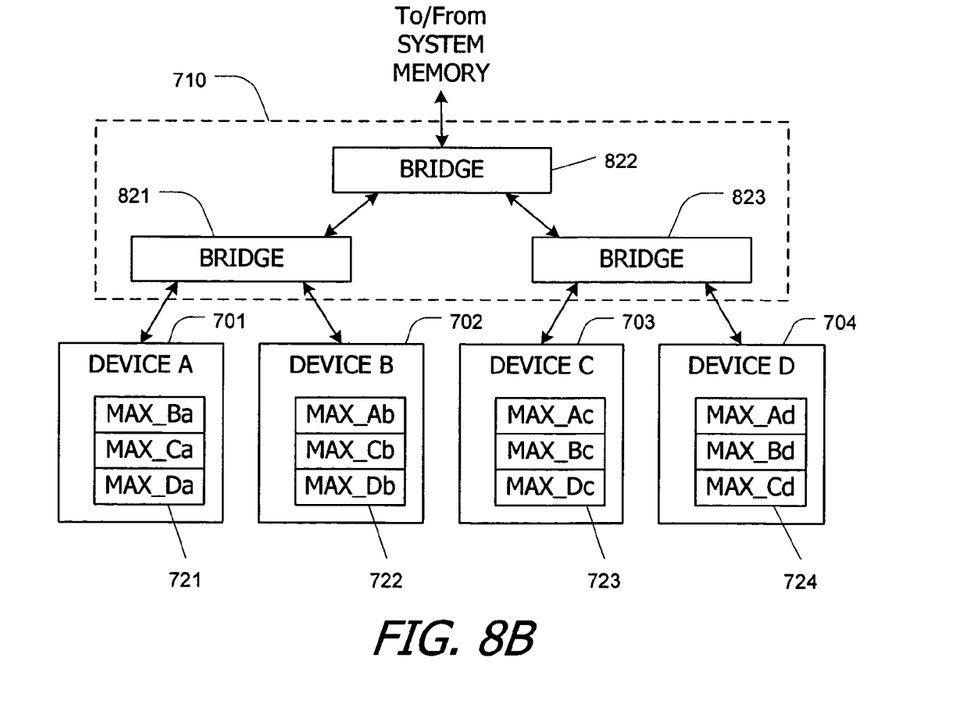

FIG. 8B is a simplified block diagram showing a possible alternative structure of interconnectivity fabric 710 of FIG. 7 that may be present in an embodiment of the present invention. In this embodiment, interconnectivity fabric 710 includes three bridges 821, 822, 823 arranged hierarchically. Bridges 821-823 may be of generally conventional design.

Those skilled in the art will recognize that, as with the structure shown in FIG. 8A, the latency for communications between two of peer devices 701-704 depends on the number of bridges 821-823 that are traversed. For instance, a request from device 701 to device 704 traverses all three bridges 821, 822, and 823, while a request from device 703 to device 704 traverses only bridge 823. Because the latency from device 701 to device 704 is longer than the latency from device 703 to 704, it may be desirable to allow more requests to be in flight between devices 701 and 704 than between devices 703 and 704. As described above, this preference can be accommodated by making MAX_Da larger than MAX_Dc, while maintaining the property that the sum of MAX_Da, MAX_Db, and MAX_Dc does not exceed the total depth of the read mailbox in device 704. Similar logic can be applied to other requester/target pairs.

Heterogeneous Peer Devices

Figure 9:
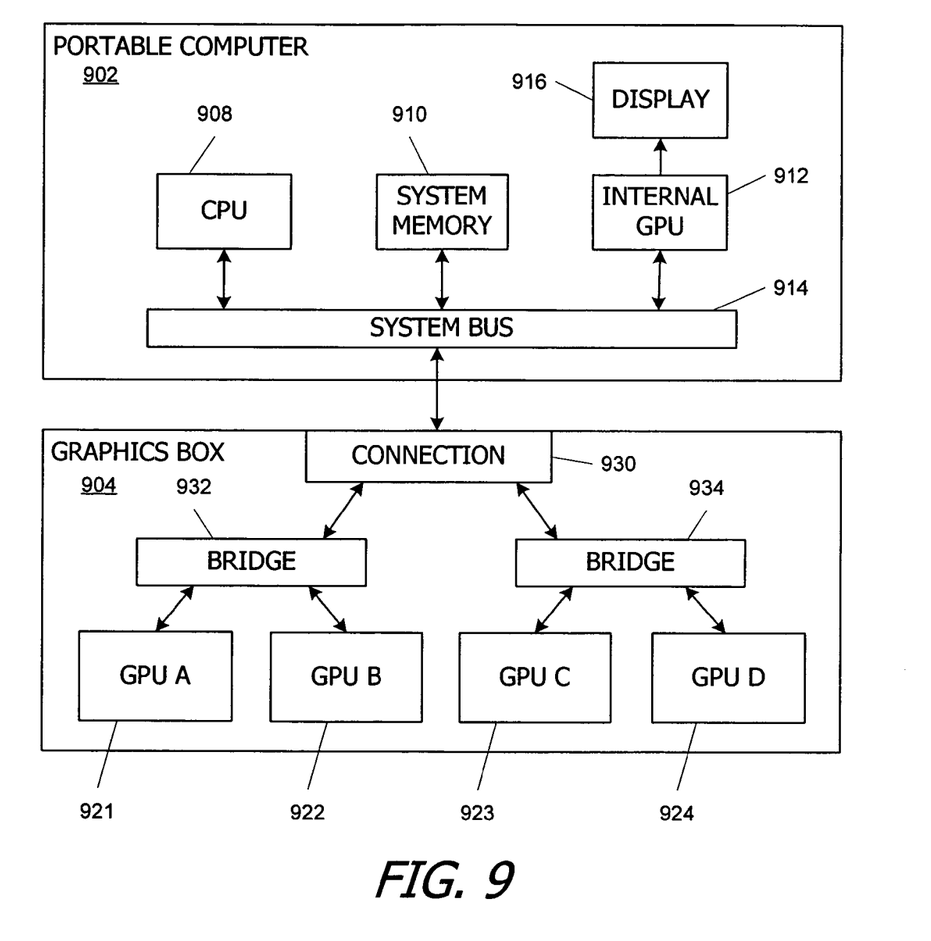
FIG. 9 is a simplified block diagram of a computing environment in which an embodiment of the present invention can be practiced.

As noted above, the peer devices in an embodiment of the present invention need not be of identical design. By way of example, FIG. 9 illustrates a computing environment 900 in which the present invention can be exploited. Environment 900 includes a portable computer 902 coupled to an external graphics box 904.

Portable computer 902 may be, for example, a laptop computer of generally conventional design and may include a CPU 908, system memory 910, and an internal GPU 912 all connected by a system bus 914, which may be of generally conventional design, including, e.g., a PCI or PCI-Express™ bus. Internal GPU 912 drives an integrated display 916. In some embodiments, integrated display 916 may be supplemented or replaced by a display port (not explicitly shown) for connecting to an external display device as is known in the art. It is to be understood that portable computer 902 may include support circuits (e.g., clocks, power supplies and the like), disk drives, user I/O devices, thermal management elements, and other conventional computer system components not explicitly shown in FIG. 9. Portable computer 902 is advantageously capable of standalone operation in the absence of external graphics box 904.

External graphics box 904 includes four GPUs 921-924, which may be of identical or different designs. GPUs 921 and 922 are connected to a connection device 930 by a first bridge 932, while GPUs 923 and 924 are connected to connection device 930 by a second bridge 934. Bridges 932 and 934, together with connection device 930, interconnect all of GPUs 921-924 in external graphics box 904.

Connection device 930 also provides a connection between graphics box 904 and system bus 914. In one embodiment, connection device 930 includes a receptacle for a cable configured to carry PCI-Express™ signals between connector 930 and a corresponding PCI-Express™ port of portable computer 902. Thus, graphics box 904 can be connected to or disconnected from portable computer 902 as desired.

Graphics box 904 may also include support circuits (e.g., clocks, power supplies and the like), disk drives, user I/O devices, thermal management elements, and other components not explicitly shown in FIG. 9. In one embodiment, graphics box 904 may have a form factor comparable to a shoebox drive.

In some embodiments, GPUs 921-924 are all identical and may be high-power, high-throughput devices optimized for demanding real-time graphics applications. Internal GPU 912 of portable computer 902 may be a low-power, lower-performance device optimized for use in portable computers. When graphics box 904 is connected to portable computer 902, the combined processing power of five GPUs—i.e., the four external GPUs 921-924 as well as internal GPU 912—can be exploited in computing environment 900.

More specifically, the combination of bridges 932 and 934, connection device 930, and system bus 914 provides an interconnectivity fabric linking all five GPUs 912 and 921-924 as peers in computing environment 900. Thus, GPUs 912 and 921-924 can exchange data using the protocols described above. In particular, each of GPUs 912 and 921-924 advantageously includes watermark logic with as many as four high-water mark registers to control read requests to each other one of GPUs 912 and 921-924. At system initialization, a graphics driver executing on CPU 908 determines how many GPUs are connected and assigns a high-water mark for each possible requester/target pair as described above. Thereafter, the assigned high-water marks are used to regulate peer-to-peer read requests in the manner described above.

Those of ordinary skill in the art will recognize that computing environment 900 is illustrative and that the present invention can be practiced in any computing environment with multiple homogeneous or heterogeneous peer devices.

FURTHER EMBODIMENTS

While the invention has been described with respect to specific embodiments, one skilled in the art will recognize that numerous modifications are possible. For instance, any number of peer devices may be present, and each peer device may use high-water marks to limit the number of requests made to other peer devices. The peer devices may be, but are not required to be, GPUs.

To facilitate understanding of the present invention, various components are shown herein as being grouped into blocks. For instance, certain elements are identified as being within a host logic block while other elements are identified as being within a fabric interface block. Such descriptions are not intended to imply a particular physical arrangement of circuit structures. Those skilled in the art will appreciate that the various components described herein may be arranged on a chip (or multiple chips) in any manner desired.

The high-water marks may be determined by reference to any or all of the factors disclosed herein or other factors, singly or in combination. In some embodiments, optimized values for the high-water marks for one or more specific configurations of the computing environment may be determined by empirical testing, and a device driver (e.g., graphics driver) may be programmed to recognize the specific configurations for which optimized high-water marks are known and to assign high-water marks to each peer device accordingly. The particular read mailbox depths shown herein are illustrative, and those having ordinary skill in the art will recognize that a read mailbox may have any depth desired including depths much larger than those shown herein (e.g., 32, 54, 96, 128, 192, or any other number of entries).

Further, in embodiments described above, each peer device stores a high-water mark for each possible target to which it can send read requests. In some embodiments, the number of registers in a peer device can be reduced, e.g., by assigning the same high-water mark to more than one of the possible targets of that peer device.

Thus, although the invention has been described with respect to specific embodiments, it will be appreciated that the invention is intended to cover all modifications and equivalents within the scope of the following claims.

What is claimed is:

1. In a computer system, a method for making peer-to-peer read requests between a plurality of peer devices, the method comprising:

generating a first read request in a requesting one of a plurality of peer devices, the first read request targeting a first target one of the plurality of peer devices, wherein each one of the peer devices has a device-specific high-water mark associated therewith, the device-specific high-water mark for each one of the peer devices being based on a maximum number of outstanding read requests allowed to target that one of the peer devices;

determining whether a first number of outstanding read requests by the requesting device to the first target device exceeds a device-specific high-water mark associated with the first target device;

blocking the first read request within the requesting device in response to determining that the first number of outstanding read requests exceeds the device-specific high-water mark associated with the first target device, wherein the first read request remains blocked until the first number of outstanding read requests no longer exceeds the device-specific high-water mark associated with the first target device;

executing the first read request in response to determining that the first number of outstanding read requests does not exceed the high-water mark associated with the first target device;

generating a second read request in the requesting device, the second read request targeting a second target device, wherein the second read request is generated subsequently to generating the first read request;
determining whether a second number of outstanding read requests by the requesting device to the second target device exceeds a device-specific high-water mark associated with the second target device;
blocking the second read request within the requesting device in response to determining that the second number of outstanding read requests exceeds the device-specific high-water mark associated with the second target device, wherein the second read request remains blocked until the second number of outstanding read requests no longer exceeds the device-specific high-water mark associated with the second target device; and
executing the second read request in response to determining that the second number of outstanding read requests does not exceed the device-specific high-water mark associated with the second target device,
wherein in the event that the second read request is generated while the first read request is blocked, the second read request is also blocked until the first number of outstanding read requests no longer exceeds the device-specific high-water mark associated with the first target device.

2. The method of claim 1 wherein executing the first read request includes:
converting the first read request to a first write request packet;
transmitting the first write request packet to the first target device; and
receiving, in response to the first write request packet, a completion packet from the first target device, the completion packet including read data requested in the first read request.

3. The method of claim 2 further comprising:
in response to converting the first read request, incrementing the first number of outstanding read requests; and
in response to receiving the completion packet, decrementing the first number of outstanding read requests.

4. The method of claim 1 wherein the device-specific high-water mark associated with the first target device and the device-specific high-water mark associated with the second target device are different.

5. The method of claim 1 wherein the device-specific high-water mark associated with the first target device is determined based at least in part on a number of entries included in an incoming read request queue in the first target device.

6. The method of claim 1 wherein the device-specific high-water mark associated with the first target device is determined based at least in part on a latency of an interconnectivity fabric via which the requesting device communicates with the first target device.

7. The method of claim 1 further comprising:
setting a value for the device-specific high-water mark associated with the first target device during a system initialization.

8. A device for use in a computing environment, the device comprising:
host logic configured to:
  generate peer-to-peer read requests including a first read request targeting a first peer device of a plurality of peer devices, wherein each one of the peer devices has a device-specific high-water mark associated therewith, the device-specific high-water mark for each one of the peer devices being based on a maximum number of outstanding read requests allowed to target that one of the peer devices; and
  report a first number of outstanding read requests by the device to the first peer device;
a fabric interface configured to communicate with an interconnectivity fabric connecting the device to one or more peer devices including the first peer device;
a first control register configured to store a device-specific high-water mark associated with the first target device;
a second control register configured to store a device-specific high-water mark associated with a second target device; and
watermark logic configured to block the first read request from being forwarded to the fabric interface for transmission into the interconnectivity fabric in the event that the first number of outstanding read requests exceeds the device-specific high-water mark associated with the first target device, wherein the first read request remains blocked until the first number of outstanding read requests no longer exceeds the device-specific high-water mark associated with the first target device, wherein the watermark logic is further configured to block a second read request targeting the second target device from being forwarded to the fabric interface for transmission into the interconnectivity fabric in the event that a second number of outstanding read requests by the requesting device to the second target device exceeds the device-specific high-water mark associated with the second target device, wherein the second read request remains blocked until the second number of outstanding read requests no longer exceeds the device-specific high-water mark associated with the second target device, wherein the second read request is generated subsequently to generating the first read request, and wherein in the event that the second read request is generated while the first read request is blocked, the second read request is also blocked until the first number of outstanding read requests no longer exceeds the device-specific high-water mark associated with the first target device.

9. The device of claim 8 further comprising:
a read mailbox configured to queue read requests received from the one or more peer devices via the fabric interface;
wherein the host logic is further configured to generate a completion packet in response to each read request queued in the read mailbox and to forward each completion packet to the fabric interface,
wherein the fabric interface is configured to transmit each completion packet generated by the host logic into the interconnectivity fabric.

10. The device of claim 8 wherein the host logic is further configured to package read requests into write request packets and to provide the write request packets to the fabric interface,
wherein the watermark logic is further configured to block the first read request from reaching the packaging logic in the event that the number of outstanding read requests exceeds the device-specific high-water mark associated with the first target device.

11. The device of claim 8 wherein the watermark logic is further configured to block any subsequent read requests generated by the host logic from being forwarded to the fabric interface while the first read request remains blocked.

12. A computer system comprising:
a plurality of peer devices; and
an interconnectivity fabric supporting peer-to-peer communication among the plurality of peer devices, wherein each one of the plurality of peer devices includes:
host logic configured to:
generate read requests including a first read request targeting a first target one of the plurality of peer devices, wherein each one of the peer devices has a device-specific high-water mark associated therewith, the device-specific high-water mark for each one of the peer devices being based on a maximum number of outstanding read requests allowed to target that one of the peer devices; and
report a first number of outstanding read requests by the one of the peer devices to the first target device;
a fabric interface configured to communicate with the interconnectivity fabric;
a first control register configured to store a device-specific high-water mark associated with the first target device defining a maximum number of outstanding requests by the one of the peer devices to the first target device;
a second control register configured to store a device-specific high-water mark associated with a second target one of the peer devices device defining a maximum number of outstanding requests by the one of the peer devices to the second target device; and
watermark logic configured to block the first read request from being forwarded to the fabric interface in the event that the first number of outstanding read requests exceeds the device-specific high-water mark associated with the first target device, wherein the first read request remains blocked until the first number of outstanding read requests no longer exceeds the device-specific high-water mark associated with the first target device, and wherein the watermark logic is further configured to block a second read request targeting the second target device from being forwarded to the fabric interface in the event that a second number of outstanding read requests by the one of the peer device to the second target device exceeds the device-specific high-water mark associated with the second target device, wherein the second read request remains blocked until the second number of outstanding read requests no longer exceeds the device-specific high-water mark associated with the second target device, wherein the second read request is generated subsequently to generating the first read request, and wherein in the event that the second read request is generated while the first read request is blocked, the second read request is also blocked until the first number of outstanding read requests no longer exceeds the device-specific high-water mark associated with the first target device.

13. The computer system of claim 12 wherein each one of the peer devices further includes a read mailbox configured to store incoming read requests, the read mailbox having a predetermined depth.

14. The computer system of claim 13 wherein a sum of the high-water marks used by the watermark logic in all other ones of the peer devices is used to determine whether to block read requests targeting a first one of the peer devices does not exceed the depth of the read mailbox in the first one of the peer devices.

* * * * *